United States Patent [19]

Takahashi

[11] Patent Number: 5,196,947
[45] Date of Patent: Mar. 23, 1993

[54] IMAGE COMMUNICATION APPARATUS

[75] Inventor: Masatomo Takahashi, Tokyo, Japan

[73] Assignee: Canon Kabushiki Kaisha, Tokyo, Japan

[21] Appl. No.: 615,149

[22] Filed: Nov. 19, 1990

[30] Foreign Application Priority Data

Nov. 22, 1989 [JP] Japan ................... 1-302221

[51] Int. Cl.⁵ ............ H04N 1/00; H04N 1/40
[52] U.S. Cl. ................. 358/441; 358/437; 358/444
[58] Field of Search ........... 358/441, 442, 443, 444, 358/400, 403, 404, 431, 434, 437

[56] References Cited

U.S. PATENT DOCUMENTS

| | | | |
|---|---|---|---|
| 4,719,514 | 1/1988 | Kurahayashi et al. | 358/431 |
| 4,719,516 | 1/1988 | Nagashima | 358/444 |
| 4,789,900 | 12/1988 | Takahashi | 358/439 |
| 4,821,107 | 4/1989 | Naito et al. | 358/440 |
| 4,827,349 | 5/1989 | Ogata et al. | 358/434 |
| 4,829,385 | 5/1989 | Takezawa | 358/433 |
| 4,845,569 | 7/1989 | Kurahayashi et al. | 358/400 |
| 4,878,123 | 10/1989 | Miura et al. | 358/401 |
| 4,887,164 | 12/1989 | Takahashi | 358/443 |
| 4,897,735 | 1/1990 | Oneda | 358/442 |
| 4,900,902 | 2/1990 | Sakakibara | 235/375 |
| 4,907,094 | 3/1990 | Mishima et al. | 358/437 |
| 4,907,231 | 3/1990 | Watanabe et al. | 358/209 |
| 4,910,785 | 3/1990 | Nakatsuma | 382/9 |
| 5,072,310 | 12/1991 | Yamamoto et al. | 358/444 |

Primary Examiner—Stephen Brinich
Assistant Examiner—Thomas D. Lee
Attorney, Agent, or Firm—Fitzpatrick, Cella, Harper & Scinto

[57] ABSTRACT

An image communication apparatus includes a data memory for storing image data in a detachable storage medium or reading out image data from the storage medium, a detection unit for detecting an attach/detach state of the storage medium, a transmission unit for transmitting image data stored in the storage medium, and a warning unit for generating an alarm according to a detection result of the detection unit during transmission of the image data.

8 Claims, 2 Drawing Sheets

IMAGE COMMUNICATION APPARATUS

BACKGROUND OF THE INVENTION

1. Field of the Invention

The present invention relates to an image communication apparatus and, more particularly, to an image communication apparatus having a function of storing an image in a detachable storage medium.

2. Related Background Art

As a conventional apparatus of this type, a facsimile apparatus which has an image data reading means and a means for storing read image data, and which transmits image data after it buffers the image data to be transmitted in an image memory is known.

In this arrangement, from the viewpoint of the action of an operator, he or she can designate a destination station without waiting for the end of a communication period whose duration tends to be influenced by a communication performance of the destination station, and can load an original in a memory. Thus, the operator can recover the original, and can perform another work.

As a conventional storage means constituting the image memory described above, a semiconductor memory, a magnetic disk (e.g., a hard disk), and the like are used.

However, since the conventional storage means is fixed to the apparatus, data associated with communications (image data, records of communications with other stations, telephone numbers of destination stations, and the like) cannot be managed in units of a plurality of operators who commonly use the apparatus, resulting in inconvenience.

Thus, in place of conventional non-exchangeable storage media, for example, a floppy disk, a memory card, and the like may be used as storage media.

In this arrangement, however, since the recording media are exchangeable, problems which are not recognized at all in an apparatus which uses conventional non-exchangeable media are posed. For example, in a memory transmission mode, if a storage medium (e.g., a floppy disk) which stores transmission image data is unloaded from the apparatus during transmission, the following data transmission can no longer be performed.

As applications associated with a communication apparatus which stores image data in a detachable storage medium, U.S. application Ser. No. 855,704 (filed on Apr. 25, 1986: U.S. Pat. No. 4,827,349), U.S. application Ser. No. 914,652 (filed on Oct. 2, 1986: U.S. Pat. No. 4,829,385), U.S. application Ser. No. 911,779 (filed on Sep. 26, 1986), U.S. application Ser. No. 281,898 (filed on Dec. 6, 1988: U.S. Pat. No. 4,910,785), U.S. application Ser. No. 267,732 (filed on Nov. 3, 1988), U.S. application Ser. No. 942,208 (filed on Dec. 16, 1986), U.S. application Ser. No. 147,224 (filed on Jan. 22, 1988), and U.S. application Ser. No. 516,301 (filed on Apr. 30, 1990) are known.

However, no proposals which can solve the above-mentioned problems have been made yet.

SUMMARY OF THE INVENTION

It is an object of the present invention to improve an image communication apparatus in consideration of the above-mentioned problems.

It is another object of the present invention to provide an image communication apparatus which, when a storage medium is unloaded during a communication of image data, can continue an image communication without ending it.

It is still another object of the present invention to provide an image communication apparatus which, when a storage medium is unloaded during a communication of image data, can urge an operator to re-load a storage medium, and can continue an image communication.

The above and other objects of the present invention will be apparent from the following detailed description of the preferred embodiment, and the accompanying drawings.

DETAILED DESCRIPTION OF THE PREFERRED EMBODIMENT

An embodiment of the present invention will be described in detail hereinafter with reference to the accompanying drawings. An embodiment of a G3 facsimile apparatus which complies with the CCITT recommendation T4 will be exemplified below.

Figure 1:
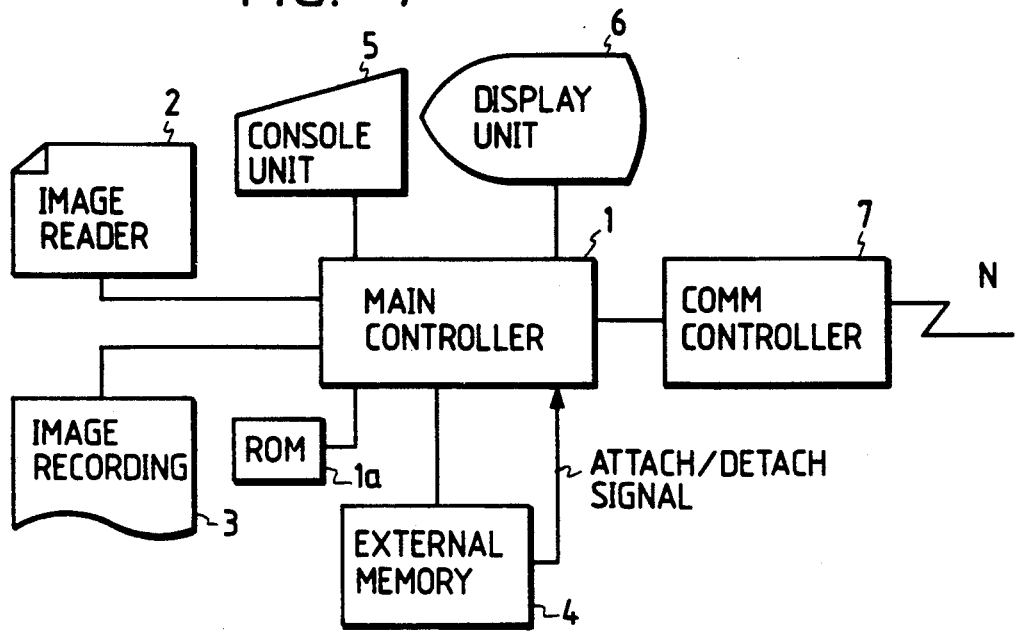
FIG. 1 is a block diagram showing an arrangement of an image communication apparatus according to the present invention.

FIG. 1 shows an arrangement of an image communication apparatus according to the present invention.

A main controller 1 shown in FIG. 1 comprises, e.g., a microprocessor, and controls the operation of the overall apparatus according to programs stored in a ROM 1a. The main controller 1 is connected to the following members.

An image reader 2 comprises, e.g., a CCD line sensor, an original convey system, and the like, and is used to read an original image.

An image recorder 3 comprises, e.g., a thermal recording head, and a recording sheet convey system, or a laser beam printer, and is used to record a received image or to record an image read by the image reader 2 in an original copy mode.

An external memory 4 comprises, e.g., a floppy disk drive, a memory card recording/reproduction apparatus, or the like, and exchanges data with a storage medium such as an exchangeable floppy disk or memory card.

In this embodiment, in transmission processing, the main controller 1 causes the external memory 4 to store image data to be transmitted, which are read by the image reader 2, and then, sequentially transmits the image data in the external memory 4.

Furthermore, the external memory 4 includes a sensor for detecting an attach/detach state of the exchangeable storage medium with respect to the external memory 4. Since such a sensor is known to those who are skilled in the art in a floppy disk apparatus or a memory card recording/reproduction apparatus, a detailed description thereof will be omitted here. Information of the attach/detach state of the storage medium detected by the external memory 4 is supplied to the main controller 1.

A console unit 5 comprises a keyboard including a start key, a stop key, a ten-key pad, function keys, and the like. A display unit 6 comprises, e.g., an LCD display, and is used to display present time, an operation state, and the like. The console unit 5 and the display unit 6 are used as user interface means. In this embodiment, the display unit 6 is also used to generate a warning in association with attachment/detachment of the external memory 4.

A communication controller 7 constitutes an interface means with a network N, and comprises a known modem, an NCU, a calling signal detector, a call generator, and the like.

Figure 3:
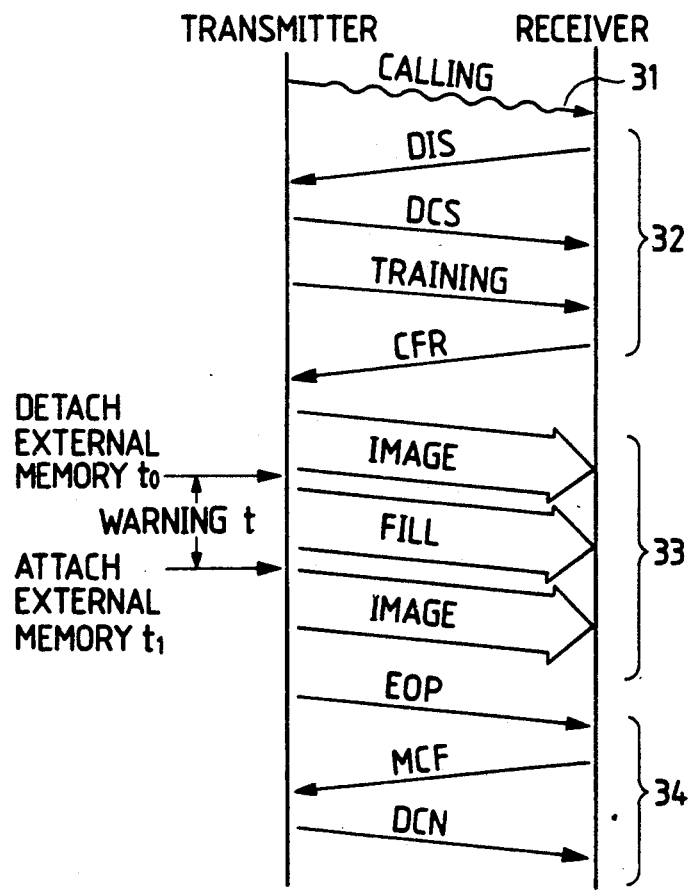
FIG. 3 is an explanatory view showing a signal exchange sequence between the apparatus shown in FIG. 1 and a receiver.

An operation of the above-mentioned arrangement will be described below with reference to FIGS. 2 and 3. A procedure shown in FIG. 2 corresponds to an image transmission control program of the main controller 1, and is stored in the ROM 1a. FIG. 3 shows a signal exchange sequence between a transmitter (apparatus of this embodiment) and a receiver.

Figure 2:
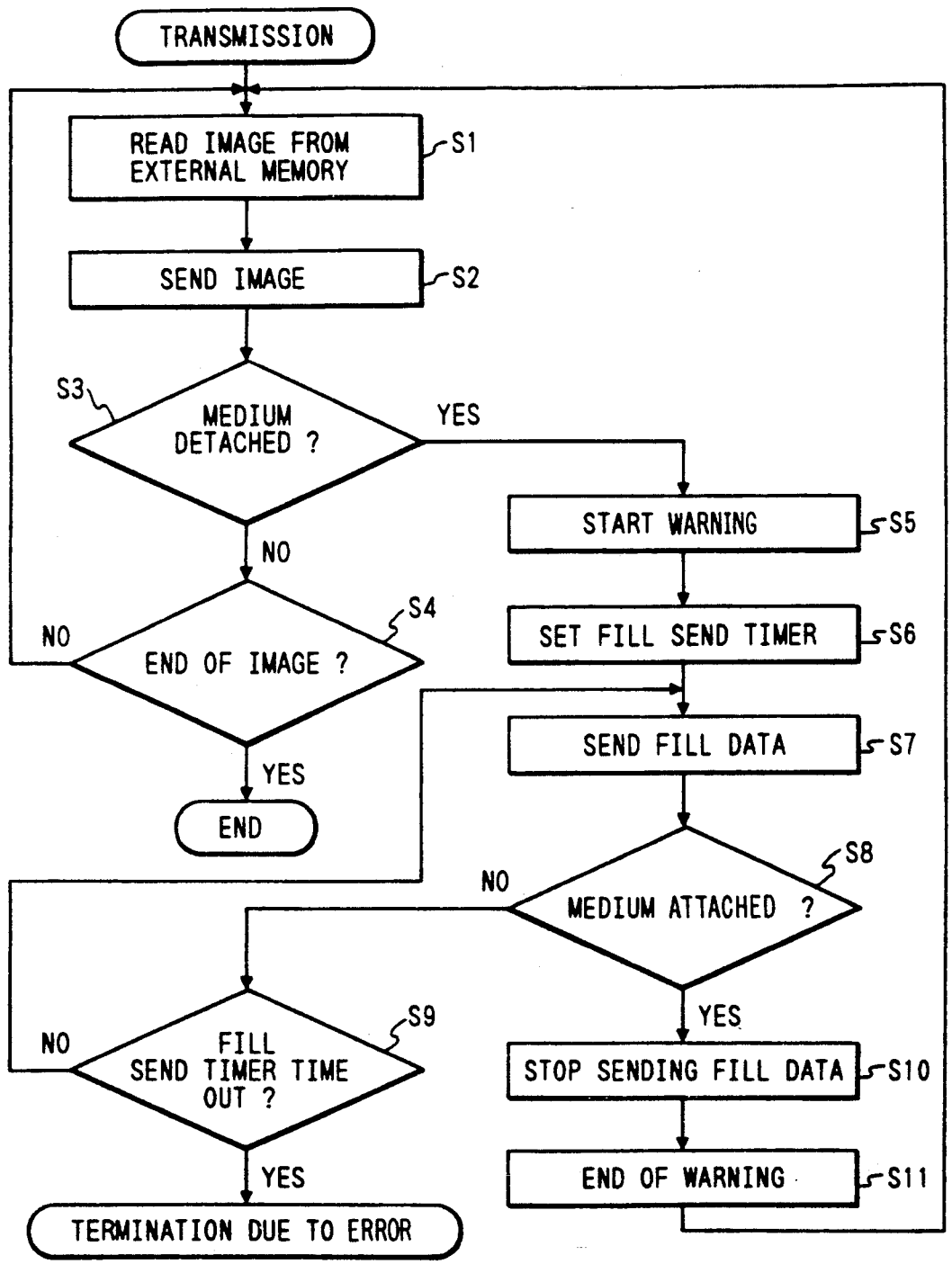
FIG. 2 is a flow chart showing a transmission control procedure by a main controller shown in FIG. 1.

Prior to the procedure shown in FIG. 2, a user sets an original on the image reader 2 like in a conventional apparatus, designates a destination station using the ten-key pad or various abbreviated dial keys of the console unit 5, and instructs transmission. Thus, the main controller 1 stores all the image data read by the image reader 2 in the external memory 4 directly or after the image data are properly encoded.

Upon completion of reading of image data, the main controller 1 causes the communication controller 7 to transmit a selection signal onto the network N. Thus, a calling signal 31 is transmitted from an exchanger to a receiver, as shown in FIG. 3.

Thereafter, a communication pre-procedure including function identification, training, and the like between the transmitter (apparatus of this embodiment) and the receiver using a DIS (digital identification) signal, a DCS (digital command) signal, and the like is performed as indirected by the numeral 32 in FIG. 3, and thereafter, image transmission is performed as denoted by reference numeral 33.

The image transmission 33 is controlled by the procedure shown in FIG. 2.

In step S1 in FIG. 2, the main controller 1 reads image data to be transmitted from the external memory 4. In step S2, the controller 1 sends the read image data to the communication controller 7. In this case, conditions such as an encoding method, a communication speed, an image size, and the like determined by the pre-procedure 32 are used. The image data are read out from the external memory 4 and sent in units of determined volumes, e.g., 1 to several lines each of image data.

In step S3, the main controller 1 checks an attach-/detach signal representing an attach/detach state of the medium of the external memory 4 to determine whether or the storage medium of the external memory 4 is detached. If it is determined in step S3 that the storage medium is attached, the controller 1 repeats processing from step S1, and continues image transmission.

If it is determined in step S3 that the storage medium of the external memory 4 is detached, the flow advances to step S5, and the controller 1 starts processing for warning that image data cannot be read out from the external memory 4 since the storage medium of the external memory 4 is detached. This warning is made by means of a display of the display unit 6, or may be performed using a buzzer (not shown).

In step S6, a predetermined time is set in an FILL send timer comprising, e.g., an internal timer of the main controller 1, and the timer is started.

In step S7, FILL data is sent. The FILL data is transmission/reception data defined in the CCITT recommendation T4, and the like, and has a predetermined value. The FILL data can be used to adjust a processing time difference caused by a difference between functions of the transmitter and the receiver. For example, the FILL data is added to image data on the transmitter side to satisfy a minimum transmission time of the receiver.

After the FILL data of a predetermined unit is sent in step S7, the attach/detach signal of the external memory 4 is checked again in step S8 to determine if the storage medium of the external memory 4 is attached. In this checking operation, not only the presence/absence of the medium but also whether or not the same medium as that before detachment is loaded, i.e., if image data currently subjected to transmission are stored in the attached medium are also checked.

If it is determined in step S8 that the medium storing the image data currently subjected to transmission is attached, sending of FILL data is stopped in step S10, and warning processing of the display unit 6, and the like is ended in step S11. The flow then returns to step S1 to restart processing for sequentially sending image data read out from the external memory 4.

During the image transmission period 33 in FIG. 3, with the above-mentioned processing, FILL data is sent from the transmitter (apparatus of this embodiment) to the receiver during a period from when the storage medium of the external memory 4 is detached at time t0 until it is attached again at time t1, and thereafter, image data is read out from the reattached storage medium of the external memory 4 and is sent.

If NO in step S8, a time-out state of the FILL sending timer set with the predetermined time started in step S6 is checked in step S9. If the FILL data has been transmitted for the predetermined time, the communication is terminated as an error (in this case, causes of the error may be output by the recorder 3 like in the conventional apparatus). If NO in step S9, processing from step S7 is repeated.

The count time of the timer for restricting a FILL sending time started in step S6 falls within a maximum transmission time of 5 seconds of an EOL (end of line code) indicating a time between the end of one line to the end of the next line. This time may be determined to be a desired value in advance before image transmission by exchanging, e.g., an NSF (non-standard device) signal, an NSS (non-standard device setting) signal, and the like between the transmitter and the receiver. Thus, the storage medium of the external memory 4 can be kept detached for a time longer than 5 seconds described above. However, a too long or non-limited medium reattach enable time is not preferable in consideration of an increase in communication time, and a delay of other communication processing.

According to the embodiment described above, during transmission of image data stored in an exchangeable storage medium of the external memory 4, if the medium is detached, a warning is generated for a predetermined period of time without immediately terminating transmission processing as an error, and the medium is allowed to be reattached. Therefore, interruption of image transmission due to detachment of the medium, and waste of a processing time and communication cost due to re-transmission of image data can be prevented.

Since the external memory 4 is of a detachable type, media of the external memory 4 can be given to a plurality of users who commonly use the apparatus, and each user can individually manage data associated with communications (image data, records of communications with other stations, telephone numbers of destination stations, and the like) using his or her medium, as a matter of course.

Such data management itself can be attained by utilizing a processing technique in known computer systems, various electronic equipments, and the like using exchangeable media, a detailed description thereof will be omitted here.

In the above embodiment, once all the image data are stored in the storage medium of the external memory 4, a call is generated. However, the present invention may be applied to an arrangement which reads an image after a network is connected, and transmits the read image data after it is buffered in a storage medium of the external memory 4. In the above embodiment, the G3 facsimile procedure has been exemplified. However, a transmission procedure itself may adopt various other communication procedures such as a G4 facsimile procedure.

As can be understood from the above description, an image communication apparatus which temporarily stores image data to be transmitted in a storage medium detachable from the apparatus, and transmits the image data in the storage medium to a destination station, comprises detection means for detecting an attach-/detach state of the storage medium, and communication control means for, when the detection means detects during transmission of image data stored in the storage medium that the storage medium is detached, transmitting time adjustment data to the destination station for a predetermined period of time, for causing the detection means to detect if the storage medium is reattached, for, when the detection means detects reattachment of the storage medium within the predetermined period of time, continuing transmission of the image data stored in the storage medium, and for, when the detection means does not detect reattachment of the storage medium within the predetermined period of time, terminating the transmission processing as an error, or for causing predetermined warning means to generate a warning to an operator for the predetermined period of time, and for, when the detection means detects reattachment of the storage medium within the predetermined period of time, stopping the warning of the warning means.

Thus, when it is detected during transmission of image data stored in a detachable storage medium that the storage medium is detached, time adjustment data is transmitted for a predetermined period of time to hold a transmission state, and to allow the storage medium to be reattached. If the storage medium is reattached, image transmission can be continued without being interrupted. Alternatively, a warning is generated to an operator for the predetermined period of time, thereby warning that the storage medium is detached, and urging the operator to reattach the medium. Thus, interruption of image transmission due to detachment of the medium, and waste of a processing time and communication cost due to re-transmission of image data can be prevented.

The present invention is not limited to the above embodiment, and various modifications may be made.

What is claimed is:

1. An image communication apparatus comprising:
    data storage means for storing image data in a detachable storage medium or reading out image data from said storage medium;
    detection means for detecting an attach/detach state of said storage medium;
    means for transmitting image data stored in said storage medium;
    warning means for generating an alarm according to a detection result of said detection means during transmission of the image data; and
    communication control means for, when said detection means detects during transmission of image data stored in said storage medium that said storage medium is detached, transmitting time adjustment data to a destination station for a predetermined period of time, for causing said detection means to detect if said storage medium is reattached, for, when said detection means detects reattachment of said storage medium within the predetermined period of time, continuing transmission of the image data stored in said storage medium, and for, when said detection means does not detect reattachment of said storage medium within the predetermined period of time, terminating transmission processing as an error.

2. An apparatus according to claim 1, wherein a warning is generated to an operator by said warning means during the predetermined period of time, and when said detection means detects reattachment of said storage medium within the predetermined period of time, the warning by said warning means is stopped.

3. An image communication apparatus comprising:
    data storage means for storing image data in a detachable storage medium or reading out image data from said storage medium;
    detection means for detecting an attach/detach state of said storage medium;
    means for transmitting image data stored in said storage medium; and
    control means for performing transmission control according to a detection result of said detection means,
    wherein when said storage medium is detached during transmission of image data, said control means determines whether or not said storage medium is reattached within a predetermined period of time, and continues the transmission of image data when said storage medium is reattached within the predetermined period of time.

4. An apparatus according to claim 3, wherein said control means terminates the transmission of image data as an error when said storage medium is not reattached within the predetermined period of time.

5. An apparatus according to claim 5, wherein said control means causes to transmit time adjustment data during the predetermined period of time.

6. An image communication method comprising the steps of:
    reading out image data stored in a detachable storage medium;
    transmitting the readout image data;
    detecting an attach/detach state of said storage medium during transmission of the image data;

continuing image transmission when said storage medium is detached during transmission and is reattached within a predetermined period of time; and terminating the image transmission as an error when said storage medium is not attached within the predetermined period of time.

7. A method according to claim 6, further including the step of transmitting time adjustment data during the predetermined period of time.

8. A method according to claim 6, further including the step of generating an alarm when said storage medium is detached during transmission.

* * * * *

UNITED STATES PATENT AND TRADEMARK OFFICE
CERTIFICATE OF CORRECTION

PATENT NO. : 5,196,947

DATED : March 23, 1993

INVENTOR(S) : MASATOMO TAKAHASHI

It is certified that error appears in the above-identified patent and that said Letters Patent is hereby corrected as shown below:

<u>COLUMN 6</u>

Line 59, "claim 5," should read --claim 3,--.

Signed and Sealed this

Eighteenth Day of January, 1994

Attest:

BRUCE LEHMAN

*Attesting Officer*    *Commissioner of Patents and Trademarks*